D. C. MYERS.
Seed-Planter.
No. 28,684.
Patented June 12, 1860.
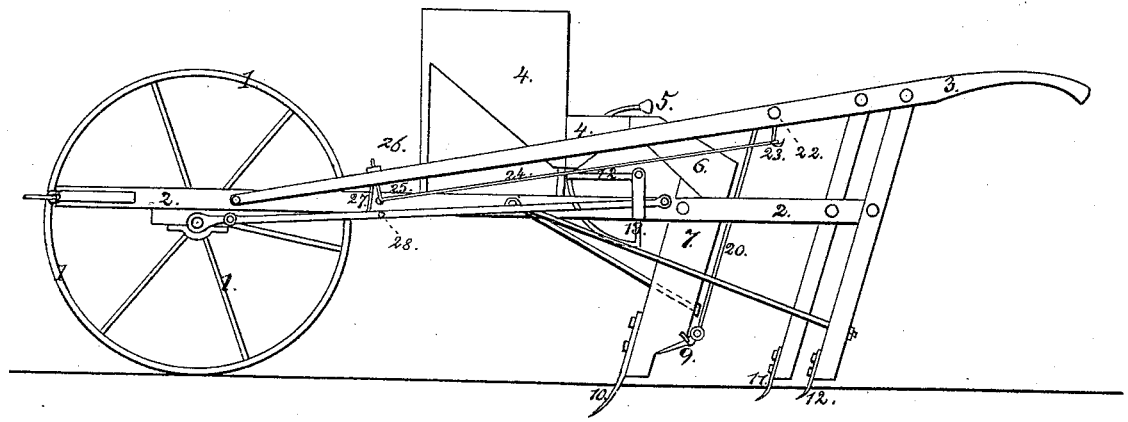
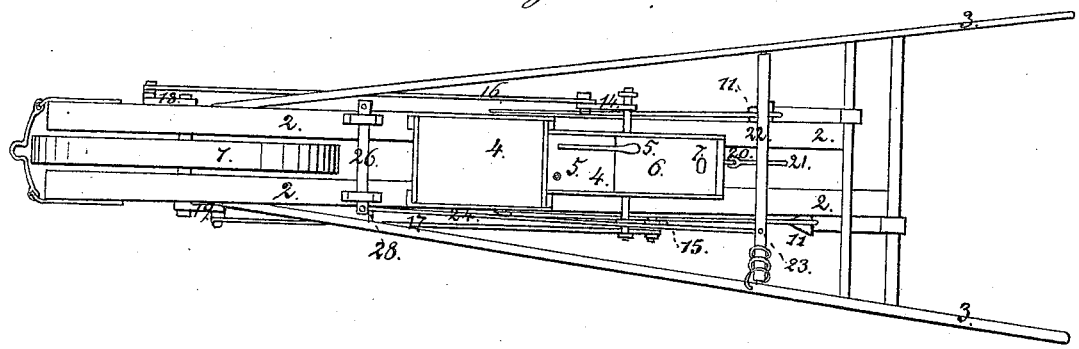
Witnesses:
Alvia Dascomb
W. H. Elliott
Inventor:
D. C. Myers

UNITED STATES PATENT OFFICE.

D. C. MYERS, OF RICHMONDALE, OHIO.

IMPROVEMENT IN CORN-PLANTERS.

Specification forming part of Letters Patent No. 28,684, dated June 12, 1860.

*To all whom it may concern:*

Be it known that I, D. C. MYERS, of Richmondale, in the county of Ross and State of Ohio, have invented certain Improvements in Corn-Planters, the construction and operation of which I have described in the following specification and illustrated in its accompanying drawings with sufficient clearness to enable competent and skilled workmen in the arts to which it pertains or is most nearly allied to make and use my invention.

My said invention consists in the arrangement of certain parts in combination with each other, in the manner hereinafter described, by which certainty and ease of action are very much facilitated at a trifling expense, as hereinafter more fully set forth.

My invention is represented in the accompanying drawings as follows:

Figure 1 is a side elevation of my machine. Fig. 2 is a plan of it.

1 is the traction-wheel of the machine, by which motion is given to the dipping cups and valves which regulate the discharge of the seed.

2 is the frame of the machine, and 3 3 are the handles.

4 is the hopper in which the seed to be planted is placed, and from which it is discharged at proper intervals by the action of the dipping and measuring cups 5 5 into the hopper 6, which terminates in a discharging-spout, 7, at the bottom, which spout 7 guides the seed nearly to the ground, the bottom of it being closed by a foot-valve, 9, which is opened at regular intervals by proper mechanism.

The cultivator-tooth 10 is fastened on the front side of this spout 7 to prepare a furrow for the seed, which furrow is closed again after the seed is dropped by the plows or teeth 11, placed on either side of the plow 10 and behind it.

The dipping-cups or measuring-cups 5 5 are attached to rods which are bent into the form of a circle and pass through holes in the bottom of the hopper 4, to connect the cups to vibrating arms or cranks 12 and 13, by the vibration of which the cups are operated. Cranks 14 and 15 are attached to the same shaft that the cranks 12 and 13 are attached to, and the vibration of these last would of course in that case give vibration to the others. The necessary vibration or action is given to the cups in this way by means of the connecting-rods 16 and 17, which, by means of the cranks 18 and 19 on the main shaft of the traction-wheel, receive motion directly from the said wheel. As these cranks are exactly opposite to each other upon the shaft, it is apparent that the cups 5 5 will have a reverse motion to each other, and that while one is coming up to deliver the seed it contains the other is descending for a supply to be discharged, while its fellow is descending and is at its lowest point of descent. By this arrangement the corn is agitated in different parts of the hopper in such a manner as to insure the perfect filling of the cells which take up the seed, and gives in consequence a more accurate measurement of seed than would be realized from the use of a single seed-cup working in the same manner. Both these cups 5 5 discharge into the hopper 6, from which it is conducted by the spout 7 down upon the foot-valve 9, and from thence delivered by the action of the latter, at proper intervals, to the ground. To operate this valve 9, a rod, 20, extends from it to the arm or crank 21, which is attached to the shaft 22, hung in the handles of the machine. From this shaft another crank or arm, 23, extends at right angles to 21, to receive the connecting-rod 24, which at the other end connects with the arm or crank 25 of the shaft 26. A trip, 27, extends downward from each end of the shaft 26, and a pin, 28, in each of the connecting-rods 16 and 17, catches one of these trips as the connecting-rod is raised and moved forward, and by this means the foot-valve 9 is operated. The pins are thus disconnected from the trips more promptly than if they moved in a straight line.

By the arrangement of parts above described the dipping-cup is made available in combination with the foot-valve, and both are operated in a very simple and efficient manner, while at the same time certainty of action in all respects is secured.

I claim as my invention—

The arrangement of the hopper 4, dipping-cups 5 5, hopper 6, foot-valve 9, connecting-rods and cranks, by which it is connected to the trip-shaft 26, trip-shaft 26, tripping-pins 28, and connecting-rods 16 and 17, operating the dipping-cups, the whole being constructed and operating substantially as described, for the purposes set forth.

D. C. MYERS.

Witnesses:
ALVIN DASCOMB,
W. H. ELLIOTT.